United States Patent [19]

Okinoshima

[11] Patent Number: 4,654,408
[45] Date of Patent: Mar. 31, 1987

[54] CURABLE SILICONE COMPOSITION

[75] Inventor: Hiroshige Okinoshima, Annaka, Japan

[73] Assignee: Shin-Etsu Chemical Co., Ltd., Tokyo, Japan

[21] Appl. No.: 839,562

[22] Filed: Mar. 14, 1986

[30] Foreign Application Priority Data

Mar. 14, 1985 [JP] Japan .................................. 60-50838
Mar. 14, 1985 [JP] Japan .................................. 60-50839

[51] Int. Cl.$^4$ ............................................. C08G 77/06
[52] U.S. Cl. ..................................... 528/15; 556/430; 528/32; 528/33; 524/861; 524/862
[58] Field of Search ........................... 528/32, 15, 33; 556/430; 524/861, 862

[56] References Cited

U.S. PATENT DOCUMENTS 4,216,252 8/1980 Moeller .................................. 528/32

Primary Examiner—Melvyn I. Marquis
Attorney, Agent, or Firm—Oblon, Fisher, Spivak, McClelland & Maier

[57] ABSTRACT

A curable silicone composition comprising (A) an organosilicon compound having at least two radicals of the formula: $ViSi(R^1)_2Si(R^1)_2-Z-$ wherein $R^1$ is a lower alkyl radical and Z is a bivalent radical of $-O-$ or $-(CH_2)_n$ in which n is an integer of 1 to 3, (B) a platinum catalyst, and optionally (C) an organosilicon compound having silicon bonded vinyl groups. The composition is cured through a new crosslinking mechanism without any byproducts, and has high stability at normal temperatures and good curability.

9 Claims, No Drawings

CURABLE SILICONE COMPOSITION

BACKGROUND OF THE INVENTION

1. Field of the Invention

This invention relates to a novel curable silicone composition and more particularly to a silicone composition which is cured through a unique crosslinking mechanism.

2. Description of the Prior Art

There have been known so-called addition-type curable silicone compositions crosslinking of which is effected by addition of silicon bonded hydrogen atoms

to silicon bonded vinyl radicals

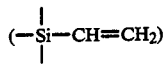

in the presence of a platinum catalyst or the like. The addition type curable silicone compositions have some advantages, one of which is, for example, that no decomposition by-products are formed in the course of curing, unlike the silicone compositions containing a peroxide as a vulcanizing agent.

SUMMARY OF THE INVENTION

It is the object of this invention to provide a novel curable silicone composition crosslinking of which is effected by a unique reaction to form a cured product such as gel, rubber, resin, etc.

This invention provides a curable silicone composition comprising:

(A) an organosilicon compound represented by the formula (I):

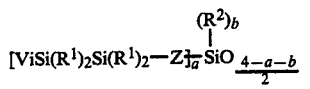

wherein Vi represents vinyl radical, $R^1$, which may be the same or different, is a lower alkyl radical, $R^2$ is a substituted or unsubstituted univalent hydrocarbon radical, Z is a bivalent radical represented by —O— or $-(CH_2)_n-$ (wherein n is an integer of from 1 to 3), and a and b are numbers such that $0 < a \leq 4$, $0 \leq b < 4$ and $0 < a+b \leq 4$, and having at least two radicals of the formula: $ViSi(R^1)_2Si(R^1)_2-Z-$ in its molecule, and (B) a platinum catalyst.

The composition of this invention further optionally comprises:

(C) an organosilicon compound represented by the formula (II):

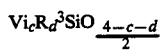

wherein Vi represents vinyl radical, $R^3$ is a substituted or unsubstituted univalent hydrocarbon radical, and c and d are numbers such that $0 < c \leq 4$, $0 \leq d < 4$ and $0 < c+d \leq 4$, and, where c+d has a value of less than 4, having at least two silicon atoms to each of which at least two vinyl radicals are bonded, or, where c+d has a value of 4, having at least three vinyl radicals in its molecule.

The silicone composition of this invention has good characteristics comparable to the prior art addition-type curable silicone compositions. In addition, especially, the composition of the invention has high stability at normal temperatures and, therefore, good storage properties and workability.

DETAILED DESCRIPTION OF THE INVENTION

In the formula (I) representing the organosilicon compound of component (A) used in the composition of this invention, $R^1$ is a lower alkyl radical such as methyl, ethyl, propyl, and $R^2$ is a substituted or unsubstituted univalent hydrocarbon radical, for example, aliphatic hydrocarbon radicals such as methyl, ethyl, propyl, butyl, vinyl, allyl; alicyclic hydrocarbon radicals such as cyclohexyl, methylcyclohexyl, cycloheptyl; and aromatic hydrocarbon radicals such as phenyl, tolyl, xylyl, benzyl, which may be substituted by halogen atoms such as fluorine, chlorine, bromine or iodine, alkoxyl radicals, silyl radicals represented by $(R^2)_3Si-$, siloxyl radicals represented by $(R^2)_3SiO-$ (wherein $R^2$ is the same as defined above), etc.

The organosilicon compounds of the formula (I) include silanes and siloxanes. The polysiloxanes can be produced by the conventional methods, which are apparent to those skilled in the art, for instance, a method of reacting a disiloxane having hydroxyl radicals at both ends thereof with a 1-vinyl-2-chloro-tetraalkyldisilane in the presence of pyridine to produce a tetrasiloxane terminated at both ends by the vinyltetraalkyldisilanyl radicals; a method of subjecting the tetrasiloxane thus obtained to an equilibrating reaction with a cyclic siloxane such as a cyclotetradialkylsiloxane to obtain a polysiloxane having an extended molecular chain; a method of adding a suitable siloxane containing a silicon bonded hydrogen atom to one of the vinyl radicals of 1,2-divinyldisilane; and so on.

Typical examples of the organosilicon compounds represented by the formula (I) are:

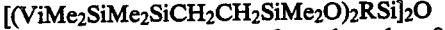

wherein n is an integer of not less than 0, preferably from 0 to 5,000, and R represents a lower alkyl such as methyl and butyl and phenyl.

The platinum catalysts for use as component (B) in the composition of this invention are not particularly limited, and include, for example, chloroplatinic acid, alcoholic solutions of chloroplatinic acids, vinylsiloxane derivatives of chloroplatinic acid, platinum black, platinum carbon, complexes of chloroplatinic acid with an olefin or aldehyde, etc., among which particularly preferred are chloroplatinic acid, the alcoholic solutions thereof and the vinylsiloxane derivatives thereof, in terms of their high activity. A suitable amount of the platinum catalyst used in the composition is from 1 to 100 ppm, preferably from 5 to 50 ppm, as platinum, in the whole composition. If the amount is less than 1 ppm, reaction proceeds slowly, leading to poor efficiency, and on the other hand, use of the catalyst in an amount of more than 100 ppm will not promise a further increase in the effect and is not economical.

In the formula (II) representing the component (C) optionally used in the composition of this invention, $R^3$ represents a substituted or unsubstituted univalent hydrocarbon radical, like $R^2$ in the formula (I).

The silanes and siloxanes represented by the formula (II) can be produced by conventional methods, which are apparent to those skilled in the art, for instance, a method of subjecting a cyclic siloxane such as cyclotetradialkylsiloxane to an equilibrating reaction in the presence of an alkali using a vinyl-terminated dialkylsiloxane as a terminator.

Typical examples of the organosilicon compounds represented by the formula (II) are:

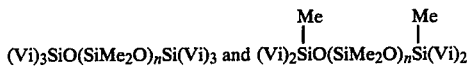

wherein n is an integer of not less than 0, preferably from 0 to 5,000.

The organosilicon compound of component (C) represented by the formula (II) is preferably used in an amount of not more than 10,000 parts by weight, more preferably from 100 to 1,000 parts by weight per 100 parts by weight of the organosilicon compound of component (A). The use of the compound of the general formula (II) in the composition is advantageous in that the state of a cured product obtained can be easily controlled to be gel, rubber or resin by changing the ratio of the amounts of components (A) and (C).

To the composition of this invention may be added, if required, inorganic fillers such as various kinds of silica, alumina, calcium carbonate, etc.; pigments and dyes; antioxidants; reaction inhibitors, and so on. Although the addition of the reaction inhibitor is generally not required, it is effective where a large amount of catalyst is added. In addition, to control the flexibility of a cured product obtained, a non-reactive polysiloxane fluid, e.g., a diorganopolysiloxane such as a dimethylpolysiloxane, may be incorporated in the composition, as required.

In the composition of the invention, the total amount of component (A) and, optionally, component (C) is preferably not less than 50% by weight based on the solid content of the composition.

The composition of this invention is generally prepared by mixing the aforementioned components without using solvents. However, the composition can also be prepared in the state of being diluted with a suitable organic solvent, as required. Preferable organic solvents for use in such a case include, for example, aliphatic hydrocarbons such as n-hexane, n-heptane, n-octane and the like; aromatic hydrocarbons such as benzene, toluene, xylene and the like; and ethers such as tetrahydrofuran, dioxane, dibutyl ether and the like.

The composition of this invention can yield a variety of types of cured products such as gel, rubber, resin, etc., depending on the kinds and proportions of the aforementioned components.

The composition of this invention is cured by heating at from 70° to 200° C. The method of heating is not particularly limited, and may be any of the conventional methods.

The composition of this invention is an application, to the crosslinking of polymer, of the disproportionation of a compound containing vinyltetraalkyldisilanyl radicals in the presence of a platinum catalyst, discovered by the present inventor. It is considered that the vinyltetraalkyldisilanyl radicals in the component (A) are crosslinked according to the following mechanism:

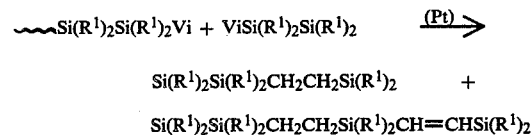

wherein ∼ each represent a polymer chain.

Where the compound of general formula (II) is used as component (C), it is considered that the crosslinking takes place not only through the above reaction but through the addition of the vinyltetraalkyldisilanyl radicals possessed by component (A) to the vinyl radicals possessed by component (C), according to the following mechanism:

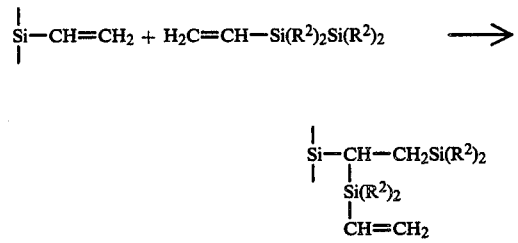

wherein ∼ each represent a polymer chain.

This invention will now be described more in detail with reference to the working examples, which are not to be construed as limiting the scope of the invention. The term "part(s)" used hereinbelow means "part(s) by weight", unless otherwise specified.

EXAMPLES

EXAMPLE 1

With 100 parts of a polydimethylsiloxane fluid having the average structure represented by the formula:
ViMe$_2$SiMe$_2$SiO(SiMe$_2$O)$_{380}$SiMe$_2$SiMe$_2$Vi
and having a viscosity of 2400 cs, 0.05 part of a 2-ethylhexanol solution of chloroplatinic acid (concentration: 2%, as platinum) was admixed to obtain a uniform fluidic composition. The thus obtained composition was heated at 150° C., then it became gummy after 5 min of heating.

EXAMPLE 2

With 100 parts of a polydimethylsiloxane having the average structure represented by the formula:
ViMe$_2$SiMe$_2$SiCH$_2$CH$_2$SiMe$_2$O(SiMe$_2$O)$_{20}$-SiMe$_2$CH$_2$CH$_2$SiMe$_2$SiMe$_2$Vi
was admixed 0.05 part of the same platinum catalyst as that used in Example 1. On heating the thus obtained composition at 150° C. for 5 min, a soft gel was obtained.

With 100 parts of a polydimethylsiloxane of the average structure represented by the formula:
ViMe$_2$SiMe$_2$SiCH$_2$CH$_2$SiMe$_2$O(SiMe$_2$O)$_{150}$-SiMe$_2$CH$_2$CH$_2$SiMe$_2$SiMe$_2$Vi
obtained by extending the chain of a polydimethylsiloxane, 0.05 part of the same platinum catalyst as above was admixed. The resulting composition was heated at 150° C. for 5 min, then the composition became gummy.

EXAMPLE 3

With 100 part of one of the three kinds of siloxanes represented by the following formula:
[(ViMe$_2$SiMe$_2$SiCH$_2$CH$_2$SiMe$_2$O)$_2$RSi]$_2$O
wherein R is phenyl, butyl or methyl, 0.05 part of the same platinum catalyst as that used in Example 1 was admixed. The three resulting compositions were heated at 150° C. for 5 min, then all of them yielded hard elastomers.

EXAMPLE 4

A composition was prepared by mixing 50 parts of the polydimethylsiloxane used in Example 1, 50 parts of the siloxane (R is butyl) used in Example 3 and 0.05 part of the same platinum catalyst as used in Example 1. On heating the composition at 150° C. for 5 min, a rubber was formed. When the composition was left to stand at room temperature for 7 days, the viscosity of the composition little changed.

EXAMPLE 5

With the composition of Example 4 was further admixed 10 parts of fumed silica. On heating the resulting composition at 150° C. for 5 min, a rubber with enhanced mechanical strength was obtained.

EXAMPLE 6

A composition comprising 100 parts of a polydimethylsiloxane having trivinylsiloxyl radicals at both ends thereof and having a viscosity of 3000 cs, 10 parts of a siloxane having vinyldisilanyl radicals represented by the formula:
[(ViMe$_2$SiMe$_2$SiCH$_2$CH$_2$SiMe$_2$O)$_2$n-BuSi]$_2$O
and 0.05 part of a 2-ethylhexanol solution of chloroplatinic acid (platinum content: 2%), was prepared. This composition is hereinafter referred to as "Composition A".

Separately, a composition which is the same as Composition A except that a polydimethylsiloxane having vinyldimethylsiloxyl radicals at both ends thereof and having a viscosity of 3000 cs was used in place of the abovementioned trivinylsiloxyl-terminated polydimethylsiloxane, was prepared. This composition is hereinafter referred to as "Composition B".

On comparing the curabilities of the two compositions obtained above, the following results were obtained. In addition, the results of leaving the two compositions to stand at room temperature for 1 month are also shown below.

|  | Composition A (Working example) | Composition B (Comparative example) |
| --- | --- | --- |
| Gelation time at 150° C. | 5 min | more than 120 min |
| State after curing at 150° C. for 30 min | rubber | fluid |
| Viscosity change after leaving to stand at room temperature for 1 month | none | none |

The results show that Composition A, which is an example of this invention, is highly stable at room temperature and has good curability.

EXAMPLE 7

A composition comprising 100 parts of a polydimethylsiloxane having divinylmethylsiloxyl radicals at both ends thereof and having a viscosity of 3000 cs, 70 parts of a siloxane of the formula:
ViMe$_2$SiMe$_2$SiO(SiMe$_2$O)$_{150}$SiMe$_2$SiMe$_2$Vi,
30 parts of a siloxane of the formula:
[(ViMe$_2$SiMe$_2$SiCH$_2$CH$_2$SiMe$_2$O)$_2$n-BuSi]$_2$
and 0.2 part of a vinyldimethylpolysiloxane derivative of chloroplatinic acid (platinum content: 1%) was prepared. On heating this composition at 150° C. for 30 min, a rubber was obtained. Replacement of the catalyst in the composition with the catalyst used in Example 6 produced no change in the curability of the composition.

EXAMPLE 8

With Composition A of Example 6 was further admixed 10 parts of fumed silica. The resulting composition has a curability comparable to that of Composition A, and yielded a rubber with an enhanced mechanical strength.

I claim:

1. A curable silicone composition comprising:
   (A) an organosilicon compound represented by the formula (I):

$$[ViSi(R^1)_2Si(R^1)_2-Z\overline{\!\!\!a}\,SiO\frac{4-a-b}{2}^{(R^2)_b}] \quad (I)$$

wherein Vi represents vinyl radical, R$^1$, which may be the same or different, is a lower alkyl radical, R$^2$ is a substituted or unsubstituted univalent hydrocarbon radical, Z is a bivalent radical represented by —O— or -(CH$_2$-)$_n$ wherein n is an integer of from 1 to 3, and a and b are numbers such that 0<a≦4, 0≦b<4 and 0<a+b≦4, and having at least two radicals of the formula: ViSi(R$^1$)$_2$-Si(R$^1$)$_2$—z— in it molecule, and (B) a platinum catalyst.

2. A composition according to claim 1, wherein said organosilicon compound of component (A) is:
ViMe$_2$SiMe$_2$SiO(SiMe$_2$O)$_n$SiMe$_2$SiMe$_2$Vi,
ViMe$_2$SiMe$_2$SiCH$_2$CH$_2$SiMe$_2$O(SiMe$_2$O)$_n$-SiMe$_2$CH$_2$CH$_2$SiMe$_2$Vi, or
[(ViMe$_2$SiMe$_2$SiCH$_2$CH$_2$SiMe$_2$O)$_2$RSi]$_2$O
wherein n is an integer of not less than 0, and R represents a lower alkyl group.

3. A composition according to claim 1 or 2, wherein the content of said platinum catalyst of component (B) is from 1 to 100 ppm, as platinum, in the whole composition.

4. A composition according to claim 1, which further comprises:
   (C) an organosilicon compound represented by the formula (II):

$$Vi_cR_d^3SiO\frac{4-c-d}{2} \quad (II)$$

wherein Vi represents vinyl radical, R$^3$ is a substituted or unsubstituted univalent hydrocarbon radical, and c and d are numbers such that 0<c≦4, 0≦d<4 and 0<c+d≦4, and, where c+d has a value of less than 4, having at least two silicon atoms to each of which at least two vinyl radicals are bonded, or, where c+d has a value of 4, having at least three vinyl radicals in its molecule.

5. A composition according to claim 4, wherein said organosilicon compound of component (C) is:

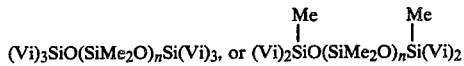

wherein n is an integer of not less than 0.

6. A composition according to claim 4, wherein the amount of said organosilicon compound of component (C) is not more than 10,000 parts by weight per 100 parts by weight of said organosilicon compound of component (A).

7. A composition according to claim 6, wherein the amount of said organosilicon compound of component (C) is from 100 to 1,000 parts by weight per 100 parts by weight of said organosilicon compound of component (A).

8. A composition according to claim 4, 5, 6 or 7, wherein the content of said platinum catalyst of component (B) is from 1 to 100 ppm, as platinum, in the whole composition.

9. A composition according to claim 1 or 4 which further comprises at least one selected from the group consisting of inorganic fillers, pigments, dyes, antioxidants and reaction inhibitors.

* * * * *